March 8, 1966     K. P. SCHUBERT     3,239,045
MECHANICAL ADVANTAGE CLUTCH
Filed March 2, 1964     2 Sheets-Sheet 1
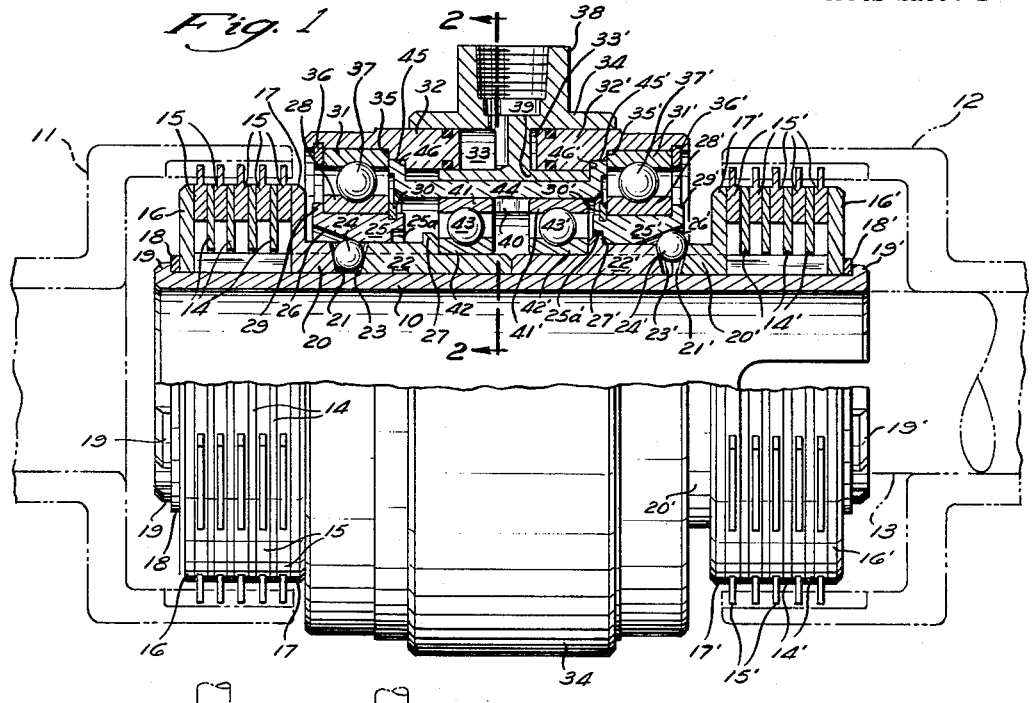
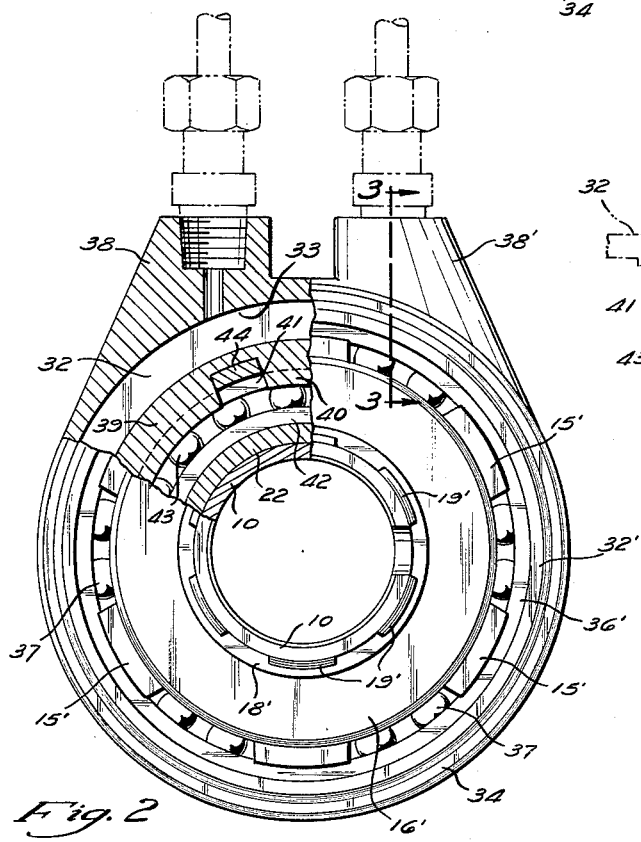
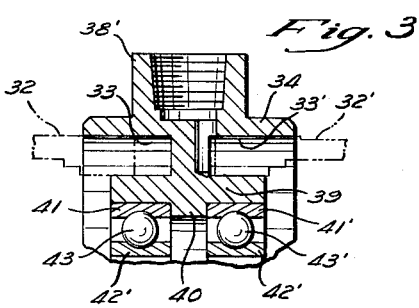
INVENTOR.
KARL P. SCHUBERT
BY Woodling, Krost, Granger and Rust
ATTORNEYS March 8, 1966  K. P. SCHUBERT  3,239,045

MECHANICAL ADVANTAGE CLUTCH

Filed March 2, 1964  2 Sheets-Sheet 2

INVENTOR.
KARL P. SCHUBERT
BY Woodling, Krost,
Granger and Rust
ATTORNEYS

United States Patent Office 3,239,045
Patented Mar. 8, 1966

3,239,045
MECHANICAL ADVANTAGE CLUTCH
Karl P. Schubert, Cleveland Heights, Ohio, assignor to The National Acme Company, a corporation of Ohio
Filed Mar. 2, 1964, Ser. No. 348,503
5 Claims. (Cl. 192—87)

This invention relates to a clutch or brake. It is a principal object of this invention to provide a novel and improved fast-acting clutch or brake.

Another object of this invention is to provide such a clutch or brake which may be operated by pressurized fluid, preferably air, without requiring a rotary seal or adaptor at the pressurized fluid supply connections to the clutch or brake.

Another object of this invention is to provide such a clutch or brake having a novel mechanical advantage mechanism for multiplying the force applied by the pressurized fluid to the clutch or brake.

It is also an object of this invention to provide such a clutch or brake having automatic wear compensation.

A further object of this invention is to provide such a clutch or brake which is compact and easy to install and which does not require yokes or other external operating mechanisms.

A still further object of this invention is to provide a novel and improved double clutch or clutch and brake combination adapted to couple one relatively rotatable body selectively and alternatively to either of two other bodies, at least one of which is rotatable.

A further object of this invention is to provide a clutch or brake mechanism which may be operated with a small force relative to the torque transmitting capabilities of the mechanism and which has a minimum of mass and inertia to permit high speed operation and fast action.

Further objects and a fuller understanding of the invention may be had by referring to the following description and claims, taken in conjunction with the accompanying drawings, in which:

FIGURE 1 is a view, with the lower half in elevation and the upper half in longitudinal section, of a double clutch or clutch and brake in accordance with the present invention;

FIGURE 2 is an end view of this clutch taken from the right end of FIGURE 1, with part of the view in section on line 2—2 of FIGURE 1;

FIGURE 3 is a fragmentary section taken along the line 3—3 in FIGURE 2 and showing one of the inlets for pressurized fluid;

Figure 5:
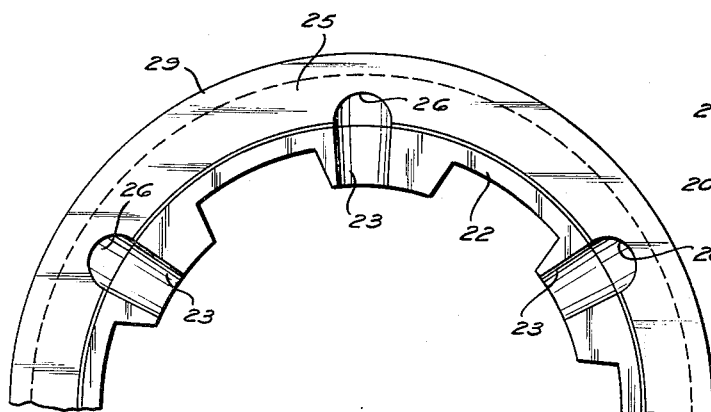
FIGURE 5 is an enlarged elevational view of certain parts of this mechanical advantage mechanism, taken along the line 5—5 in FIGURE 4.

In the following description the present invention will be described as a clutch since this is considered to be its principal practical application. However, it is to be understood that it may be used as a brake, also, if desired.

Referring to FIGURE 1, the device shown therein comprises a first rotatable clutch body 10 which is adapted to be coupled selectively and alternatively to either a second rotatable clutch body 11 or a third clutch body, shown in phantom at 12. The first clutch body 10 is adapted to be attached to a rotary drive shaft or output shaft, indicated in phantom at 13. Either of the bodies 11 and 12 may be a stationary member, if the device is to be used as a combined clutch and brake.

The first clutch body 10 is in the form of an elongated, hollow, cylindrical body. A first set of radially disposed, axially spaced, annular, flat friction plates or discs 14 are splined to the first clutch body 10 near the latter's left end in FIGURE 1. The friction plates 14 rotate in unison with the first clutch body 10 and they are shiftable lengthwise of the body 10. These friction plates 14 are interleaved between a second set of axially displaceable, radially disposed, axially spaced, annular, flat friction plates or discs 15, which are externally splined to the second clutch body 11. The interleaved friction plates 14, 15 may be considered to be confronting friction members. These plates are disposed between an annular end thrust plate 16, located at the left end of the friction plate assembly, and an axially shiftable, annular thrust plate 17, located at the right end of the friction plate assembly. Both thrust plates 16 and 17 are splined to the first clutch body 10. The thrust plate 17 may be termed a first thrust member. A snap ring 18 is engaged between plate 16 and circumferentially spaced, radially outwardly protruding, integral shoulders 19 on the left end of clutch body 10.

With this arrangement, normally the friction plates 14 and 15 interfit loosely, so that the first and second clutch bodies 10 and 11 can relatively rotate without imparting rotation from one to the other. However, when the axially shiftable thrust plate 17 is forced to the left in FIGURE 1, the friction plates 15, carried by the second clutch body 11, are clamped tightly between thrust plates 16, 17 and friction plates 14, all carried by the first clutch body. Consequently, the two clutch bodies 10 and 11 are then frictionally coupled to each other, with the friction plates 14, 15 transmitting the torque from one clutch body to the other.

The shiftable thrust plate 17 has an integral reduced diameter, annular hub 20 at its right end which presents a plurality of circumferentially spaced, ball-receiving recesses 21, each partially circular in cross-section to be open at the end of thrust plate 17 and inclined inwardly and to the right in FIGURE 1.

Figure 7:
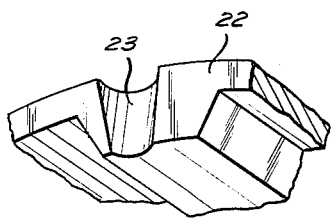
FIGURE 7 is a similar view of another part of this mechanism.

An annular thrust body 22 which may be termed a second thrust member is also splined to the first clutch body 10. Thrust body 22 presents at its left end a plurality of similar ball-receiving open recesses 23, as shown in FIGURES 5 and 7. Each of these recesses 23 is positioned directly opposite a respective one of the recesses 21 and each is a mirror image of the opposite recess 21, with an opposite inclination.

A thrust ball 24 is engaged between each pair of confronting recesses 21 and 23. Each thrust ball 24 may protrude radially outward beyond the thrust body 22 and the hub 20 on thrust plate 17. Due to the inclination of the recesses 21 and 23, when the ball 24 is forced radially inwardly, it forces the thrust plate 17 axially away from the thrust body 22, as explained hereinafter.

Figure 8:
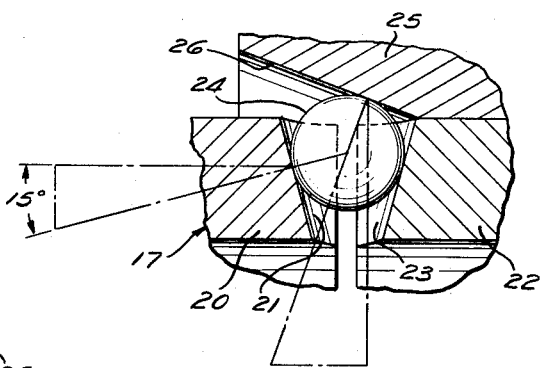
FIGURE 8 is a fragmentary section on an even larger scale showing details of the ball thrust arrangement in this mechanical advantage mechanism.

In a preferred embodiment, as shown in FIGURE 8, the recesses 21 and 23 are inclined at opposite 15 degree angles to a reference plane perpendicular to the longitudinal axis of the clutch.

Figure 6:
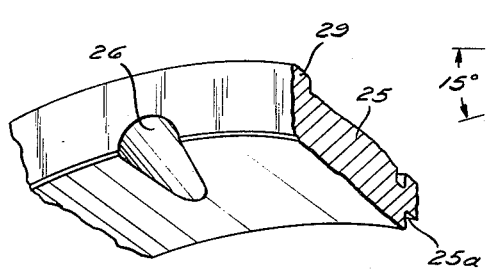
FIGURE 6 is an enlarged fragmentary perspective view of the slidable ball thrust ring in this mechanical advantage mechanism.

The radial position of the respective thrust balls 24 is controlled by a ball thrust ring or third thrust member 25, which is axially slidably mounted on the outside of the thrust body 22 and the reduced hub 20 on thrust plate 17. This ball thrust ring has a plurality of inclined, ball-engaging recesses 26 for engagement with the outer surfaces of the respective thrust balls 24. As shown in FIGURES 5 and 6, each of these recesses is of circular cross-section and is inclined inwardly to the right in FIG- URE 1. In the preferred embodiment, as shown in FIGURE 8, each recess 26 extends at an angle of 20 degrees with respect to the longitudinal axis of the clutch. As shown clearly in FIGURE 8, if the ball thrust ring 25 is forced to the left, it will force the respective thrust ball 24 radially inward to force the thrust plate 17 axially away from the thrust body 22. The balls 24 riding in the recesses 26 assure that the ball thrust ring 25 rotates with the thrust plate 17 and thrust body 22.

Figure 4:
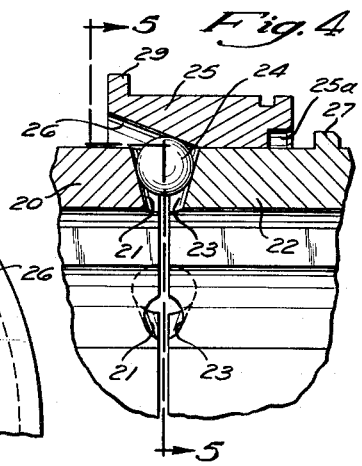
FIGURE 4 is an enlarged fragmentary sectional view showing the mechanical advantage mechanism in this clutch.

The ball thrust ring 25 presents at its right end in FIGURES 1 and 4 an annular recess 25a which is adapted to receive an annular external shoulder 27 on the thrust body 22, as explained hereinafter.

Referring to FIGURE 1, an annular inner race 28 of a ball bearing assembly is rigidly mounted on the outside of ball thrust ring 25. At its left end the ball thrust ring presents an external annular shoulder 29 which engages the left end of race 28. A snap ring 30, seated in an external groove in the ball thrust ring, engages the right end of race 28.

This ball bearing assembly has an annular outer race 31 supported rigidly on an annular piston 32. Piston 32 is slidably mounted in an annular chamber 33 formed in a stationary annular housing 34 which surrounds the first clutch body 10 for only a part of the latter's length. Piston 32 and housing chamber 33 are both coaxial with the first clutch body 10. Piston 32 presents an internal annular shoulder 35 which engages the right end of the outer race 31. A snap ring 36, seated in an internal groove in the piston, engages the left end of the outer race 31.

A plurality of balls 37 are engaged between the outer race 31 and the inner race 28 of this ball bearing assembly. The piston 32 is non-rotative, but axially movable. With this arrangement, an axial thrust on piston 32 is imparted through the ball bearing assembly 31, 37, 28 to the thrust ring 25, so that thrust ring 25 moves axially in unison with piston 32. At the same time, this ball bearing assembly permits the thrust ring 25 to rotate with respect to the non-rotatable piston 32. The ball bearing assembly is thus a combined radial and thrust bearing.

Housing 34 presents an annular internal wall 39 of appreciable axial extent which is coaxial with the clutch assembly. Wall 39 has a radially inwardly protruding shoulder 40 (FIGURE 3), which is cut away at three circumferentially spaced locations for a purpose explained hereinafter. The outer race 41 of a ball bearing assembly has its right end abutting against the left face of shoulder 40. As shown in FIGURE 1, the inner race 42 of this same ball bearing assembly abuts against the right end face of the aforementioned external shoulder 27 on the thrust body 22. Balls 43 are engaged between the bearing races 41 and 42.

With this arrangement, the housing shoulder 40 positively locates the thrust body 22 axially. Any axial thrust on body 22 is imparted through the ball bearing assembly 42, 43, 41 to housing shoulder 40. At the same time this ball bearing assembly supports thrust body 22 for rotation with respect to housing 34.

Air or other pressurized fluid is supplied to the right end of the housing chamber 33 through an internally threaded socket 38 on housing 34.

The embodiment shown in FIGURE 1 also includes a similar second clutch assembly for selectively coupling the first clutch body 10 to the third clutch body 12. The components of this second clutch assembly are arranged in the reverse order, end-to-end, from those already described, and corresponding elements are given the same reference numerals, with a prime subscript. Since these components are identical in construction and mode of operation to those already described, they need not be described in detail.

As shown in FIGURE 1, the left end of the thrust body 22' in this second clutch assembly engages the right end of the corresponding thrust body 22 in the previously-described first clutch assembly.

As shown in FIGURE 3, air is supplied to the annular housing chamber 33' in this second clutch assembly through a second internally threaded socket 38' on the housing 34.

The respective annular pistons 32 and 32' are rigidly coupled to each other by three rigid keys 44, only one of which appears in FIGURE 1. These keys are slidably disposed in the cut away portions of the internal shoulder 40 on the housing 34 and they slidably engage the internal wall 39 throughout the latter's axial extent. At its left end each key 44 has an outwardly projecting radial flange 45 which is engaged between the right end of the outer bearing race 31 and an internal annular shoulder 46 on piston 32. Similarly, each key 44 at its right end has a similar flange 45' engaged between the outer bearing race 31' and an internal shoulder 46' on piston 32'. With this arrangement, when piston 32 moves to the left, piston 32' also moves to the left, and vice versa.

*Operation*

FIGURE 1 shows the positions of the various parts when pressurized fluid, such as air, is introduced into chamber 33 to move piston 32 to the left. At this time the fluid pressure in the other chamber 33' is relieved. This may be by a four-way valve, not shown, alternatively connecting ports 38 and 38' to a pressure source or vented to atmosphere.

Such movement of piston 32 is imparted to the ball thrust ring 25 through the ball bearing assembly 31, 37, 28, so as to position the ball thrust ring 25 to the left, as shown in FIGURE 1.

Such movement of piston 32 also is imparted through the keys 44 to the other piston 32', pulling the latter to the left, as shown in FIGURE 1. This movement of the piston 32' is imparted to the corresponding ball thrust ring 25' through the ball bearing assembly 31', 37', 28' engaged between them. Consequently, ball thrust ring 25' is moved to the left, into engagement with the shoulder 27' on thrust body 22', as shown in FIGURE 1. Thrust body 22' is positively located axially by the ball bearing assembly 42', 43', 41' and the internal shoulder 40 on housing 34. With ball thrust ring 25' retracted to the left, as shown, the respective thrust balls 24' in the second clutch assembly are free to move outward centrifugally as the first clutch body 10 rotates and the thrust body 22' and thrust plate 17' rotate in unison with it. The axial position of the ball-engaging recesses 26' in thrust ring 25' is such that the balls 24' are radially outward far enough to exert no substantial axial force to the right against thrust plate 17', so that the clutch plates 14', 15' are released from clutching engagement with one another.

The movement of ball thrust ring 25 axially to the left, as described, causes the inclined ball-engaging recesses 26 in the latter to ride over the respective thrust balls 24 and force the latter radially inward. Such inward movement of the thrust balls forces the thrust plate 17 to the left to move the clutch plates 14, 15 into torque-sustaining engagement with each other and thereby couple the first clutch body 10 to the second clutch body 12.

Conversely, when the fluid pressure at bore 33 is relieved and fluid pressure is introduced into bore 33' to move piston 32' to the right, the clutch plates 14', 15' in the second clutch assembly will be engaged, coupling the first clutch body 10 to the third clutch body 12, while the clutch plates 14, 15 in the first clutch assembly will be released.

In practice, it is easily possible to achieve a mechanical advantage of 5 to 1, or greater, between the pressurized fluid force applied to either piston 32 or 32' and the axial force applied to the respective clutch plates. For example, with a 20 degree angle of the ball-engaging recesses 26 on thrust ring 25 and opposite 15 degrees angles of the ball-engaging recesses 21 and 23 on thrust plate 17 and thrust body 22, as described, the axial force on the thrust plate 17 produced by a given fluid pressure force, P, axially on piston 32 will be $$\left(P \times \frac{\cot 20°}{2} \times \cot 15°\right)$$

neglecting frictional losses. It will be noted that only the smaller fluid pressure force, P, is applied to the ball bearing assembly 31, 37, 28 which acts between piston 32 and ball thrust ring 25, so that this ball bearing assembly is not unduly stressed in operation.

The clutch is fast acting in response to the application of fluid pressure because of the low inertia of the moving parts required to bring it into engagement.

As wear takes place on the clutch plates 14, 15 and 14', 15' over a period of use, this is automatically compensated for by the coaction between each ball thrust ring 25 or 25' and the rest of the force-multiplying mechanism. Progressive wear on the clutch plates will require that the ball thrust ring move farther axially in order to bring the respective clutch plates into full engagement. Such extended movement is possible because of the angular disposition of the ball-engaging recesses 26 and 26' in the respective ball thrust rings. Such extended movement of the thrust ring 25 or 25' simply forces the respective thrust balls farther inward radially, so as to force the respective thrust body 17 or 17' farther axially in order to fully engage the clutch plates.

It is noted that the double clutch or brake unit is symmetrical about a transverse center line, and this permits the unit to be easily constructed as a single unit, since there will still be two bearings 37 and 43 in the single unit.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A clutch or brake comprising a stationary annular housing defining an annular chamber coaxial with said housing, an annular piston slidable in said chamber axially of said housing, and passage means in said housing leading into said chamber for passing pressurized fluid thereto to move said piston axially, a first torque-transmitting body rotatably mounted in said housing and coaxial therewith, first and second sets of relatively rotatable torque-transmitting friction plates in confronting relationship to one another outside said housing, the plates of said first set being coupled to said first body to rotate therewith, the plates of said second set being adapted to be coupled to a second body, a thrust plate mounted on said first body for rotation therewith and for axial displacement therealong in one direction to bring the plates of said first and second sets into torque sustaining frictional engagement with each other, said thrust plate at one end having ball-receiving recesses which are open at the periphery thereof, a thrust body axially spaced from said thrust plate and at one end having ball-receiving recesses which are open at the periphery thereof and are disposed in confronting relationship to the recesses in said thrust plate, the recesses in said thrust plate and said thrust body being progressively narrower radially inwardly, thrust balls engaged between said thrust plate and said thrust body in said ball-receiving recesses therein and projecting radially outward beyond said thrust plate and said thrust body, an axially shiftable thrust ring slidably mounted on the outside of said thrust body and having ball-receiving recess means which engage the outside of said thrust balls and which are inclined inwardly in one axial direction to force said balls radially inwardly in response to movement of said thrust ring axially in the opposite direction.

a ball bearing assembly having an outer race attached to said piston to move axially therewith, an inner race attached to and directly applying and surrounding said thrust ring to move axially therewith, and balls engaged between said outer and inner races, and a second ball bearing assembly acting between an internal shoulder on said housing and an external shoulder on said thrust body.

2. A clutch or brake according to claim 1, wherein said second ball bearing assembly has an outer race abutting at one end against said shoulder on the housing, an inner race abutting at its opposite end against said shoulder on the thrust body, and balls engaged between said last-mentioned outer and inner races.

3. A double clutch or brake comprising a first body for attachment to a shaft, a stationary housing surrounding said body and supporting the latter for rotation, said housing having a first chamber therein, a first piston slidable axially in said chamber, said housing having a second chamber therein, a second piston slidable axially in said chamber, a first series of relatively rotatable, confronting friction members at one end of said body which are adapted, when engaged, to transmit torque between said body and a second body, first means slidable on said first-mentioned body in one axial direction to bring said friction members of the first series into torque-transmitting engagement with one another, means for moving said slidable means in said one axial direction in response to movement of said first piston in said one axial direction, a second series of relatively rotatable, confronting friction members at the opposite end of said first-mentioned body which are adapted, when engaged, to transmit torque between said first body and a third body, second means slidable on said first body in the opposite axial direction to bring said friction members of the second series into torque-transmitting engagement with one another, means coupled to said last-mentioned slidable means for moving the latter in said opposite axial direction in response to movement of said second piston in said opposite axial direction, means coupling said pistons to one another for movement in unison, fluid pressure means acting on said first piston to move it way from a central portion of said stationary housing, said first and second slidable means each comprising a first thrust member on said first body, ball-receiving recesses in said thrust member at one end which are open at the periphery of the latter and are progressively narrower radially inwardly, a second thrust member on said first body having ball-receiving recesses in one end which are open at the periphery thereof and are disposed in confronting relationship to the recesses in said first thrust member, a plurality of thrust balls engaged between said thrust members in said recesses and projecting radially outward beyond said thrust members, and a thrust ring outside said thrust members and shiftable axially thereof, said thrust ring having ball-receiving recess means which engage the outside of said thrust balls and are inclined inwardly in one axial direction to force said balls radially inward in response to movement of the thrust ring in said one axial direction.

4. A double clutch comprising a hollow cylindrical first body for attachment to a shaft, a stationary housing surrounding said first body and supporting the latter for rotation, said housing having a first annular chamber therein which is coaxial with said first body, a first annular piston slidable axially in said first chamber, said housing having a second annular chamber therein which is coaxial with said first body and spaced axially from said first chamber, a second annular piston slidable axially in said second chamber, and passage means communicating with said chambers for passing pressurized fluid to and from said chambers, first and second sets of relatively rotatable torque-transmitting friction plates in confronting relationship to one another outside said housing at one end of said first body, the plates of said first set being coupled to said first body to rotate therewith, the plates of said second set being adapted to be coupled to a rotatable second body, a first thrust plate mounted on said first body for rotation therewith and for axial displacement therealong in one direction to bring the plates of said first and second sets into torque sustaining frictional engagement with each other, said thrust plate at one end thereof having ball-receiving recesses which are open at the periphery thereof, a first thrust body axially spaced from said first thrust plate and at one end having ball-receiving recesses which are open at the periphery thereof and are disposed in confronting relationship to the recesses in said first thrust plate, the recesses in said first thrust plate and said first thrust body being progressively narrower radially inwardly, thrust balls engaged between said first thrust plate and said first thrust body in said ball-receiving recesses therein and projecting radially beyond said first thrust plate and said first thrust body, an axially shiftable first thrust ring slidably mounted on the outside of said first thrust body and having ball-receiving recesses which engage the outside of said thrust balls and which are inclined inwardly in one axial direction to force said balls radially inward in response to movement of said thrust ring axially in the opposite direction, a first ball bearing assembly having an outer race attached to said first piston to move axially therewith, an inner race attached to said first thrust ring to move axially therewith and balls engaged between said outer and inner races, third and fourth sets of relatively rotatable torque-transmitting friction plates in confronting relationship to one another outside said housing at the opposite end of said first body, the plates of said third set being coupled to said first body to rotate therewith, the plates of said fourth set being adapted to be coupled to a third body, a second thrust plate mounted on said first body for rotation therewith and for axial displacement therealong in one direction to bring the plates of said third and fourth sets into torque sustaining, frictional engagement with each other, said second thrust plate at one end thereof having ball-receiving recesses which are open at the periphery thereof, a second thrust body axially spaced from said second thrust plate and at one end having ball-receiving recesses which are open at the periphery thereof and are disposed in confronting relationship to the recesses in said second thrust plate, the recesses in said second thrust plate and said second thrust body being progressively narrower radially inwardly, thrust balls engaged between said second thrust plate and said second thrust body in said ball-receiving recesses therein and projecting radially outward beyond said second thrust plate and said second thrust body, an axially shiftable second thrust ring slidably mounted on the outside of said second thrust body and having ball-receiving recesses which engage the outside of said last-mentioned thrust balls and which are inclined inwardly in said opposite axial direction to force said last-mentioned balls radially inward in response to movement of said second thrust ring in said one axial direction, a second ball bearing assembly having an outer race attached to said second piston to move axially therewith, an inner race attached to said second thrust ring to move axially therewith, and balls engaged between said outer and inner races, and means rigidly interconnecting said first and second pistons for movement axially in unison.

5. The double clutch of claim 4 wherein said housing has a centrally disposed radially inwardly protruding shoulder with axially extending openings therethrough, said last-mentioned means comprises rigid keys extending slidably through said openings and connected to said first and second pistons, said first thrust body has an external shoulder at a location thereon between said housing shoulder and said ball-receiving recesses in the first thrust body, and a ball bearing assembly is engaged between said housing and said first thrust body, said last-mentioned ball bearing assembly comprising an outer race abutting at one end against said housing shoulder, an inner race abutting at its opposite end against said external shoulder on said first thrust body, and balls engaged between said last-mentioned races, said second thrust body has an external shoulder at a location thereon between said housing shoulder and said ball-receiving recesses in the second thrust body, and a ball bearing assembly is engaged between said housing and said second thrust body, said last-mentioned ball bearing assembly comprising an outer race abutting at one end against said housing shoulder, an inner race abutting at its opposite end against said external shoulder on said second thrust body, and balls engaged between said last-mentioned races.

References Cited by the Examiner

UNITED STATES PATENTS

| 2,055,970 | 9/1936 | Fippard | 192—85 |
| 2,323,753 | 7/1943 | Jaeger et al. | 192—87 X |
| 2,376,799 | 5/1945 | Miller | 192—93 |
| 2,406,417 | 8/1946 | Viviano | 192—87 X |
| 2,856,048 | 10/1958 | Carlson | 192—93 |
| 3,064,781 | 11/1962 | Schwartz et al. | 192—48 |
| 3,065,832 | 11/1962 | Becknell | 192—85 |

FOREIGN PATENTS

| 163,247 | 6/1953 | Australia. |
| 956,237 | 7/1949 | France. |

DON A. WAITE, *Primary Examiner.*

DAVID J. WILLIAMOWSKY, *Examiner.*